(12) United States Patent
Chartier et al.

(10) Patent No.: US 8,841,886 B2
(45) Date of Patent: Sep. 23, 2014

(54) POWER CHARGING OF MOBILE DEVICES VIA A HDMI INTERFACE

(75) Inventors: Eric Chartier, Colombelles (FR); Nicolas Guillerm, Villons les Buissons (FR); Jean-Claude Denniel, Caen (FR); Philippe Maugars, Ranes (FR)

(73) Assignee: NXP B.V., Eindhoven (NL)

( * ) Notice: Subject to any disclaimer, the term of this patent is extended or adjusted under 35 U.S.C. 154(b) by 510 days.

(21) Appl. No.: 12/878,663

(22) Filed: Sep. 9, 2010

(65) Prior Publication Data
US 2011/0068736 A1 Mar. 24, 2011

(30) Foreign Application Priority Data
Sep. 11, 2009 (EP) .................................... 09170101

(51) Int. Cl.
*H02J 7/00* (2006.01)
(52) U.S. Cl.
CPC .................................. *H02J 7/0052* (2013.01)
USPC ....................................................... 320/137
(58) Field of Classification Search
CPC ................... H02J 2007/006; H02J 2007/0062; H02J 2007/0096
USPC .................................................. 320/107, 137
See application file for complete search history.

(56) References Cited

U.S. PATENT DOCUMENTS

| | | | | |
|---|---|---|---|---|
| 5,696,367 | A * | 12/1997 | Keith .............................. | 235/381 |
| 6,008,620 | A * | 12/1999 | Nagano et al. ................. | 320/106 |
| 7,834,591 | B2 * | 11/2010 | Hussain et al. ............... | 320/137 |
| 8,044,639 | B2 * | 10/2011 | Tamegai et al. ............... | 320/138 |
| 8,237,414 | B1 * | 8/2012 | Li et al. .......................... | 320/160 |
| 8,462,759 | B2 * | 6/2013 | Shakiba et al. ............... | 370/344 |
| 2002/0153862 | A1 * | 10/2002 | Kuroki .......................... | 320/114 |
| 2008/0180057 | A1 * | 7/2008 | Watanabe ...................... | 320/103 |
| 2010/0058427 | A1 * | 3/2010 | Ansari ........................... | 725/131 |
| 2010/0109795 | A1 * | 5/2010 | Jones et al. ................... | 333/101 |
| 2010/0225279 | A1 * | 9/2010 | Liao .............................. | 320/137 |
| 2010/0315036 | A1 * | 12/2010 | Liao .............................. | 320/107 |
| 2011/0038595 | A1 * | 2/2011 | Kimoto et al. ................ | 386/230 |
| 2011/0167187 | A1 * | 7/2011 | Crumlin et al. ............... | 710/303 |
| 2011/0185204 | A1 * | 7/2011 | Louboutin et al. ............ | 713/320 |
| 2011/0208980 | A1 * | 8/2011 | Brooks et al. ................. | 713/300 |
| 2012/0081067 | A1 * | 4/2012 | Burrell, IV ................... | 320/107 |
| 2012/0113645 | A1 * | 5/2012 | Liao et al. ..................... | 362/253 |
| 2012/0170342 | A1 * | 7/2012 | Manning ....................... | 363/146 |
| 2012/0178399 | A1 * | 7/2012 | Yang ............................. | 455/337 |
| 2012/0229076 | A1 * | 9/2012 | Zhu et al. ..................... | 320/107 |
| 2012/0246350 | A1 * | 9/2012 | Lee ................................ | 710/16 |

OTHER PUBLICATIONS

"Universal Serial Bus Specification Revision 2.0—Chapter 7"; 80 pages (Apr. 27, 2000).
"VESA Enhanced Display Data Channel (EDDC) Standard Version 1.2"; 43 pages (Dec. 26, 2007).
"Battery Charging Specification Revision 1.1"; 44 pages (Apr. 15, 2009).
"TDA9989 150 MHZ Pixel Rate HDMI 1.3a Transmitter with 3×8 Bit Video," Product Data Sheet. pp. 48, Jun. 11, 2009.

* cited by examiner

*Primary Examiner* — M'Baye Diao
*Assistant Examiner* — Manuel Hernandez

(57) ABSTRACT

A method is provided of charging a mobile device by a charger device, comprising transmitting and receiving a charging current via the Hot Plug Detect (HPD) pin of an HDMI cable connected between the mobile device and the charging device. The HDMI source device (the mobile device) and the HDMI sink device (the charger device) are also provided.

18 Claims, 3 Drawing Sheets

POWER CHARGING OF MOBILE DEVICES VIA A HDMI INTERFACE

This application claims the priority under 35 U.S.C. §119 of European patent application no. 09170101.1, filed on Sep. 11, 2009, the contents of which are incorporated by reference herein.

FIELD OF THE INVENTION

This invention relates to power charging of mobile devices, and in particular to power charging of mobile devices that comprise an HDMI interface.

BACKGROUND OF THE INVENTION

A mobile HDMI source device having a HDMI output connection can be connected to an HDMI sink such as a television, in order to display pictures or video. In such a use case, it would be very useful for the user to be able to take this opportunity to do power charging of the mobile device.

FIG. 1 shows the components of an HDMI version 1.4 system. The different features are discussed in turn:

TMDS Channels

Four TMDS (Transition Minimized Differential Signaling) signals are provided over 4 twisted pair wires, including 3 digital video signals (RGB or YCrCb) and 1 clock signal. The digital audio signals are also multiplexed into the digital video signals.

The Dual-Link HDMI has 3 more twisted pair wires for digital video signals to achieve higher data rate.

The data is transported via one of three modes, called the Video Data Period, the Data Island Period, and the Control Period. During the Video Data Period, the pixels of an active video line are transmitted. During the Data Island period (which occurs during the horizontal and vertical blanking intervals), audio and auxiliary data are transmitted within a series of packets. The Control Period occurs between Video and Data Island periods.

DDC Channel

The DDC (Display Data Channel) data and clock lines carry the two-way communication signals; the HDCP (High-bandwidth Digital Content Protection) signal also floats here.

The DDC channel is based on the I²C bus specification. HDMI specifically requires support for the Enhanced Display Data Channel (E-DDC), which is used by the HDMI source device to read the EDID (Enhanced display identification data) from a memory in the HDMI sink device to learn what audio/video formats it supports. An extended version E-EDID is also used.

CEC Line

The CEC (Consumer Electronics Control) data line distributes remote control signals. The feature is designed to allow the user to command and control multiple CEC-enabled boxes with one remote control, and for individual CEC-enabled devices to command and control each other without user intervention. So called "Capability Discovery and Control" commands (CDC) are sent on the CEC data line/bus.

HPD Line

The HPD (Hot Plug Detection) line allows the source to detect a display plugged in real time. Typically, the HDMI sink connects the HPD line to the 5V power supply received from the source when it is connected, so that its presence can be detected in the source.

The sink asserts a high voltage level on the Hot Plug Detect line as soon as the EDID memory is available to read. This signal indicates to the source that it can use the DDC channel (but not necessarily that the sink is ready to display a picture).

Most of the time, the Hot Plug Detect line is high, because the source needs to read the EDID memory to know the capability of the sink before transmitting any video or audio signal.

Sometimes, a short Low voltage level pulse (at least 100 msec) is asserted on the Hot Plug Detect line. The HDMI sink uses this pulse to indicate when changing input or power status, in order to reset the HDCP engine of the source.

The output impedance of Hot Plug Detect line is 1 kOhm, so the simplest connection between +5V Power line and Hot Plug Detect line is a 1 kOhm resistor (rather than a simple short).

+5 V Power Line

Thus supports remote circuits for communication even when the power is not turned on.

HEAC

The HEAC (HDMI Ethernet and Audio Return Channel) is a high-speed bi-directional channel introduced in HDMI version 1.4, which facilitates 100 Mbps Ethernet capability. The same high-speed channel also includes Audio Return functionality which means that audio can be streamed directly to an A/V receiver over the HDMI cable.

Three pins are assigned to perform this function, independent of the TMDS data and clock channels.

The Utility and HPD conductors form a differential pair which uses the DDC/CEC Ground (the dotted line in FIG. 1) as its shield.

With existing solutions, in order to charge a source device, the user has to plug the power charger on the required connector of the mobile device. For example, a known solution is to connect a USB charger to the USB connector of the device. This means that the user has to connect two cables, which is not very convenient and can even be impossible due to the nearness of connectors on miniaturized mobile devices.

It is therefore an aim of the invention to provide for a more convenient way of charging the mobile device.

SUMMARY OF THE INVENTION

According to a first aspect of the invention, there is provided a method of charging a mobile device by a charger device, comprising transmitting and receiving a charging current via the Hot Plug Detect (HPD) pin of an HDMI cable connected between the mobile device and the charging device.

According to a second aspect of the invention, there is provided a mobile device capable of receiving a charging current via the Hot Plug Detect (HPD) pin of a connected HDMI cable.

According to a third aspect of the invention, there is provided a charging device capable of supplying a charging current to a mobile device via the Hot Plug Detect (HPD) pin of a connected HDMI cable.

Embodiments of the invention enable a user to charge the mobile device by simply connecting an HDMI cable from the mobile device (HDMI source) to the charging device (HDMI sink).

The charging current can also be used by the mobile device to power the applications running on the mobile device and/or to charge the battery of the mobile device.

According to an embodiment, the HDMI Sink can provide charge current (5V, up to 500 mA) to the HDMI Source through the Hot Plug Detect line. The HDMI Source can detect the Power charging capability of the HDMI Sink by exchanging messages on the Data Display Chanel (DDC) bus, for example to a dedicated slave address of the HDMI sink device.

According to the acknowledgment of the DDC message by the HDMI sink device and the voltage level of the Hot Plug Detect line, the HDMI Source can determine whether or not to draw charge current from Hot Plug Detect line. This is based on determining that the charging device (the sink) has the capability of providing power for charging purposes, and that the mobile device (the source) and the charging device (the sink) have exchanged messages about the required charging current.

For this purpose, the HDMI Sink with Power Charging capability can acknowledge any DDC message sent to the dedicated slave address and indicate the available amount of current (Unit Load). In one example, the HDMI Sink with Power Charging capability can provide 5 V on the Hot Plug Detect line, with at least 20 mA to precharge the HDMI Source if the battery is completely discharged. The actual precharging current will be fixed after negotiation with portable device manufacturers.

If the identifier EDID is not available for reading or if the Power Charging capability isn't available, the Hot Plug Detect Line shall be at Low voltage level.

In the context of this document, "Legacy devices" are defined as HDMI devices without Power Charging capability, and "Updated devices" are defined as HDMI devices with the Power Charging capability. Embodiments of the invention allow for backward compatibility between the new "Updated devices" and the known "Legacy devices".

BRIEF DESCRIPTION OF THE DRAWINGS

An example of the invention will now be described in detail with reference to the accompanying drawings, in which.

DETAILED DESCRIPTION OF THE EMBODIMENTS

Specific embodiments of the invention will now be described, by way of non-limiting examples only.

The invention is based on the recognition that the HDMI interface can be adapted to provide a charging mechanism.

Figure 1:
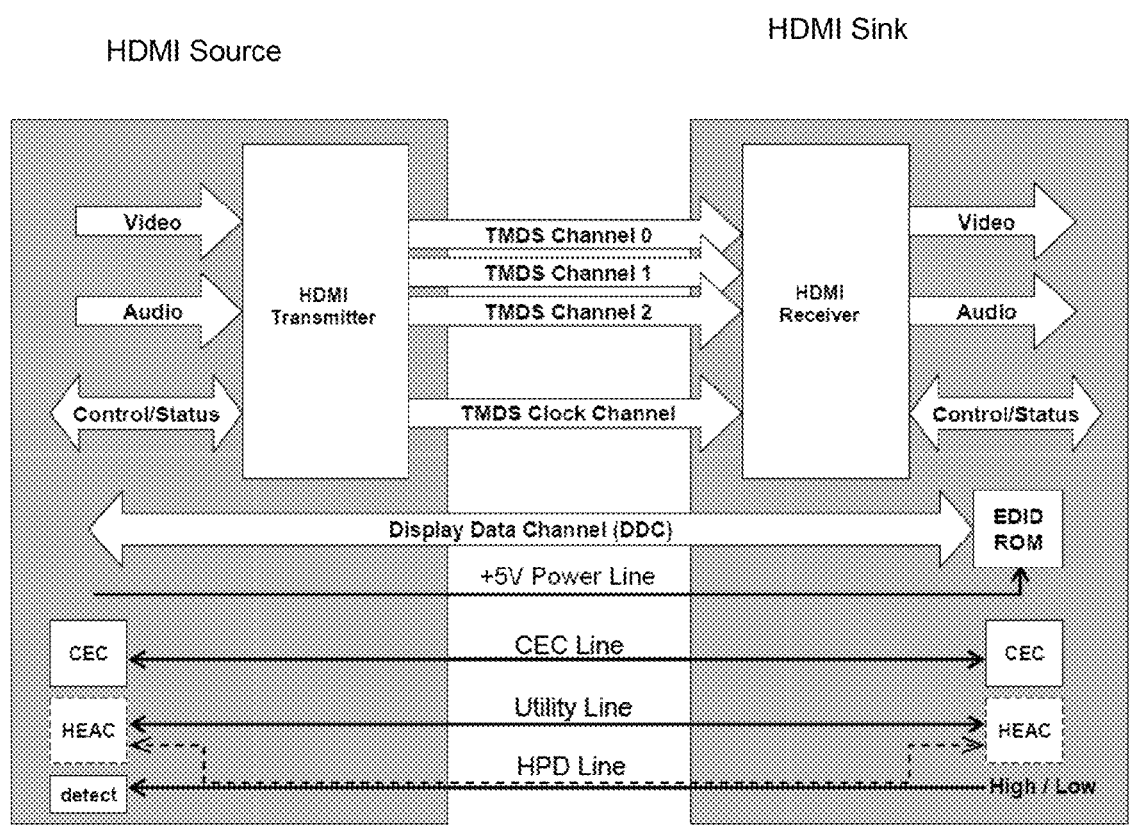
FIG. 1 shows a block diagram of the known HDMI Version 1.4 system.

In the known arrangement described above with reference to FIG. 1, the voltage of the +5V Power line is provided by the HDMI source and it is just used to supply the EDID memory when the HDMI sink is powered off, and to detect the connection of the HDMI sink, because the same power line signal is then returned by means of the Hot Plug Detect signal. It is noted that the voltage level of the Hot Plug Detect line can be made by an internal supply of the sink (with the device still satisfying the HDMI specification). Thus, the +5V Power line and the Hot Plug Detect line are not necessarily connected. The high level voltage of Hot Plug Detect is only 2.4V, and the sink can thus use an internal voltage source to bias the Hot Plug Detect line.

By default, the HDMI sink can't provide any power to supply the HDMI source.

The invention modifies the HDMI sink and HDMI source so that the sink can be used to charge the source. In a typical example, the source is mobile device and the sink is a mains powered audiovisual output device (e.g. a user plugging their portable MP4 player into a larger screen/better sound system.

To provide an HDMI sink which can be used to charge the source using the HDMI interface ("Updated Sink device"), charge current is provided to the HDMI source through the Hot Plug Detect line. The preferred charging conditions are a supply voltage at 5V+/−5% (from 4.75 V to 5.25 V) and up to 500 mA. This is equivalent to the power supply defined in the USB 2.0 specification.

Figure 2:
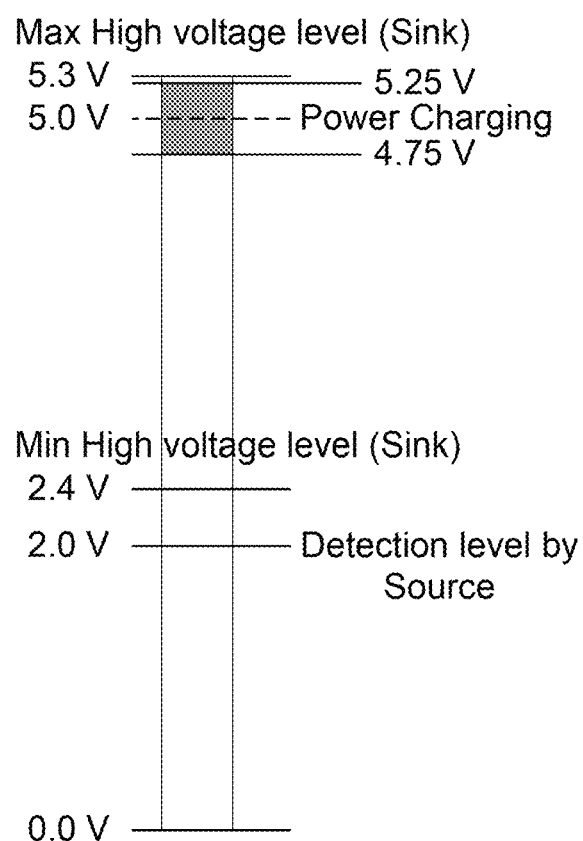
FIG. 2 shows the typical examples of voltage levels used for the hot plug detection (HPD) signal.

FIG. 2 shows the typical examples of voltage levels used for the hot plug detection (HPD) signal.

According to the HDMI specification, the limits for the high level voltage of Hot Plug detect signal is minimum 2.4 V and maximum 5.3 V. As a result, the Power Charging supply voltage shown shaded in FIG. 2 (4.75V-5.25V) is compatible with the output characteristics of the Hot Plug Detect signal defined in the HDMI specification.

The Hot Plug Detection threshold in the HDMI source is 2.0V as also shown in FIG. 2.

Figure 3:
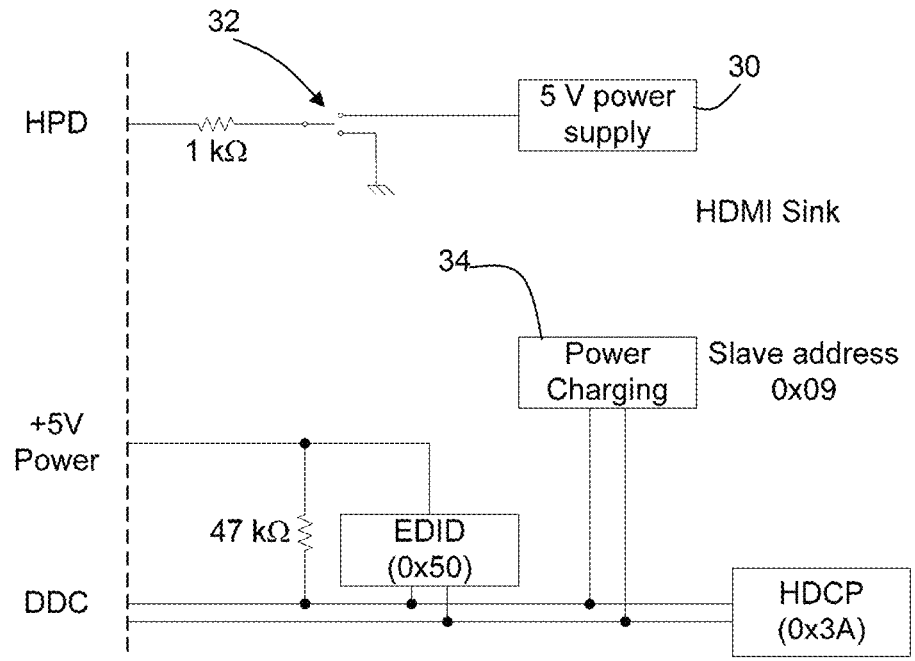
FIG. 3 shows an example of HDMI sink in accordance with the invention.

FIG. 3 shows how the sink device is modified to provide the charging capability of the invention.

A power supply 30 of the sink device is connected to the HPD line through a switch 32. The switch enables the HPD line to be connected to ground or to the power supply 30.

To maintain compatibility with the HDMI specification, the updated Sink device shall not assert a high voltage on its Hot Plug Detect pin when the EDID or E-EDID is not available for reading. Thus, as with the HDMI standard, no HPD signal is provided until the sink is available for reading. The EDID memory of the sink is not always available and connected on the DDC, for example if one memory is shared between multiple HDMI inputs. This explains the meaning of "available for reading". Thus, the sink can still provide a signal recognised as an HPD signal when it is first connected and available for reading.

In addition to this condition, the updated Sink device shall not assert high voltage on its Hot Plug Detect pin when the charging requirements of the source device are not available for reading. The communication of these charging requirements between the source and sink devices is described below.

The updated Sink device has a dedicated module 34 on the DDC-bus to indicate a charge current demand for the charging of the source device. This maximum charge current is defined as a number of Unit Loads. A Unit Load is for example defined to be 100 mA. The number of Unit Loads is the absolute maximal current the updated Source can drain. This is equivalent to the Power definition in the USB 2.0 specification.

The updated Sink device asserts a high voltage on its Hot Plug Detect pin with a minimum current of 20 mA to allow precharging of the attached HDMI Source with Power Charging capability (updated Source device).

The HDMI Sink indicates any change to the content of the EDID or E-EDID or the number of Unit Loads by driving a low voltage level pulse on the Hot Plug Detect pin. This pulse can for example be defined to last at least 100 msec.

A Legacy Sink device is arranged such that the Hot Plug Detect pin is asserted only when the +5V Power line from the source is detected on the HPD line. This mirrors the current HDMI specification, which requires that the the Hot Plug Detect pin may be asserted only when the +5V Power line from the Source is detected.

The updated Sink device instead asserts a high voltage on its Hot Plug Detect pin whenever Power Charging is available, regardless of the voltage level of +5V Power line transmitted from the source device.

A range 4.75V-5.25 V can be defined for power charging, based on the same range as the USB specification. If the voltage level of the Hot Plug Detect line is between 2.0 V and 4.75 V, the level can be considered high but power charging is not possible.

For providing the Unit Load data, the module 34 uses only one readable byte at the slave address 0x09 (7-bit format) of the DDC message. This slave address corresponds with a Smart Battery Charger device.

| S | 0x09 (Smart Battery Charger) | R | Ack | 0 | 0 | 0 | 0 | 0 | Nb of unit | Ack | P |
|---|---|---|---|---|---|---|---|---|---|---|---|

The table above shows the DDC message of the Power Charging module 34. A write message to the slave address 0x09 (7-bit format) has no effect. The $I^2C$ system allows more than one byte to be read in the same message. In this case, all bytes read have the same value.

The "Smart Battery Charger" is a dedicated slave address in the $I^2C$ specification for a battery charging feature.

The number of Unit Loads specified in the DDC message corresponds to different charging conditions, as set out in the table below:

| Nb of unit | Available current |
|---|---|
| 0 | Only precharging (20 mA) |
| 1 | 100 mA |
| 2 | 200 mA |
| 3 | 300 mA |
| 4 | 400 mA |
| 5 | 500 mA |
| 6-7 | Reserved |

The power supply 30, switch 32 and module 34 are the only adaptations required to a conventional HDMI sink, and for this reason the other components in FIG. 3 have not been described in further detail.

Figure 4:
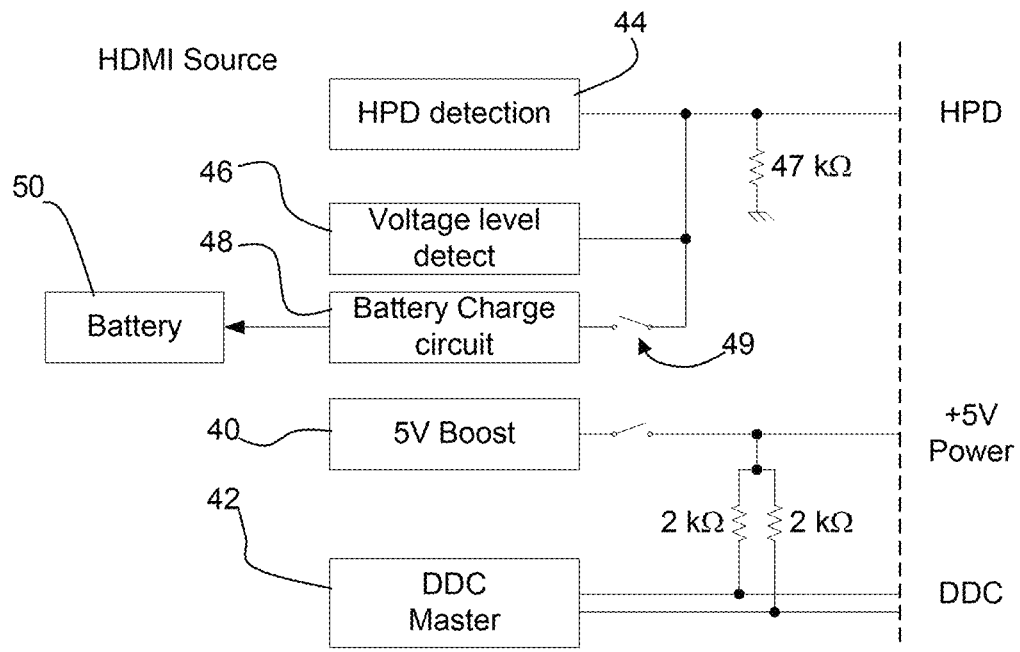
FIG. 4 shows an example of HDMI sink in accordance with the invention.

FIG. 4 shows how the source device is modified to provide the charging capability.

According to the HDMI specification, a HDMI source has at least three modules to manage the connection with a HDMI Sink:

a 5 V supply generator 40 to assert high voltage level on the +5V Power line.

a DDC master circuit to read the content of the EDID or E-EDID (defining the capabilities of the HDMI Sink) and exchange data with the HDCP module (Audio/Video encryption).

a voltage detector on the Hot Plug Detect line to know if HDMI Sink is attached and the EDID is readable.

The HDMI Source with Power Charging capability (updated Source device) has two additional modules:

a voltage detector 46 on the Hot Plug Detect line to know if the voltage level is in the range of Power charging (5V+/−5%).

a Battery Charge circuit 48 with a switch 49 to drain current from the Hot Plug Detect line and refuel the battery 50.

If the voltage level of the Hot Plug Detect line isn't in the range of Power Charging (4.75 V to 5.25 V), the updated Source device uses the Hot Plug Detect line as indicated in the HDMI specification, and does not attempt power charging from the HPG line.

When the updated Source device activates its HDMI connectivity feature, it provides a voltage level greater than 4.8 V on the +5V Power line. According to the HDMI specification, all HDMI Sources shall assert the +5V Power signal whenever the Source is using the DDC or TMDS signals.

If the voltage level of the Hot Plug Detect line is below 2.0 V, the updated Source device knows the EDID or E-EDID isn't available to read (based on the HDMI specification), and the Power Charging feature isn't available. In this case, the updated Source device can't drain any current from the Hot Plug Detect Line.

If the voltage level of Hot Plug Detect line is between 2.0 V and 4.75 V or greater than 5.3 V, the updated Source device knows the EDID of the HDMI Sink is available to read but the Power Charging feature isn't available. The updated Source device can't drain any current from the Hot Plug Detect Line.

If voltage level of Hot Plug Detect line is between 4.75 V and 5.25 V, the updated Source knows the EDID of the HDMI Sink is available and can check the Power Charging capability by reading the number of Unit Loads through the DDC bus.

If the updated Source device doesn't have acknowledgment when reading the Power Charging module of attached HDMI Sink, in this example at slave address 0x09 (7-bit format), the updated Source device knows the Power Charging feature isn't available. The Source can't drain any current on Hot Plug Detect Line.

If the updated Source device has acknowledgment when reading the Power Charging module of attached HDMI Sink and an appropriate value for the number of Unit Loads at slave address 0x09 (7-bit format), the updated Source device knows the Power Charging feature is available.

The Source can then drain current from the Hot Plug Detect Line by the Battery Charge circuit. The Source is responsible to not overload the current capability of the Sink indicated by the number of Unit Load.

The updated Source device stops the Power charging if the voltage level of Hot Plug Detect line goes below 4.75 V.

These measures mean that the updated Source device always checks the Power Charging capability of the attached HDMI Sink before draining current from Hot Plug Detect line. Firstly, it checks that the correct voltage is present on the HPD line, and then makes sure that the sink has the power charging capability by exchanging of signals relating to the charging levels—so that if a Legacy sink device happens coincidentally to provide a suitable charging voltage on the HPD line, this will not be used for charging if it is established that the sink device is a legacy device without power charging capability.

Because the updated Sink device can indicate a change to the number of Unit Loads by driving a low voltage level pulse on the Hot Plug Detect pin, the updated Source device then reads again the Power Charging module of the updated Sink device to know the new Power charging capability and adapt its current drain allocation.

If the HDMI source has a dead or weak battery, so that the source can't power up successfully, the charging capability can be used to assist with power up. The voltage level of the Hot Plug Detect line is in the range of Power Charging [4.75 V, 5.25 V] because the 5V power supply 30 of the Updated sink device provides this voltage. However, the source doesn't assert the +5V Power signal. The source therefore knows the Sink has Power Charging capability (since it must have generated the hot plug detect line voltage) and the source can then drain up to 20 mA to make a precharging of its battery. The Source is responsible to not overload this precharging current.

It will be apparent from the discussion above that the system is backward compatible, providing inter-operability with legacy devices. The possible combinations are outlined below:

Legacy Source Device Connected to Updated Sink Device:

A legacy Source doesn't drain current on the Hot Plug Detect line. It just detects the voltage level of the Hot Plug Detect line to know if a HDMI Sink is attached and if the EDID or E-EDID is available to read.

Updated Source Device Connected to Legacy Sink Device:

The legacy Sink device doesn't acknowledge the DDC message to the slave address 0x09 (7-bit format). Thus, the updated Source device knows that the attached Sink doesn't have Power Charging capability. In this case, the updated Source device shall not drain current from Hot Plug Detect line (even if the voltage on the HPD line is in the desired range).

Updated Source Device with Dead/Weak Battery Connected to Legacy Sink Device:

Because the charge level of the battery is below a threshold at which the updated Source device is able to power up successfully, the updated Source device cannot assert the +5V Power signal. According to the HDMI specification, the legacy Sink device may assert the Hot Plug Detect signal only when the +5V Power line from the Source is detected.

Thus, in the case of an updated Source device with dead/weak battery connected to a legacy Sink device, the Hot Plug Detect line is low and the updated Source device knows that the attached Sink doesn't have Power Charging capability. In this case, the updated Source device shall not drain current from the Hot Plug Detect line.

In the example above, the charging load of the HDMI source is communicated to the HDMI sink using the DDC channel. However, this is only one possible mechanism.

It is also possible to use other communication channels/messages, e.g. the Consumer Electronics Control (CEC) or Capability Discovery and Control (CDC).

In these cases, the specific slave address for Power Charging is replaced by a specific opcode:

The frame description for the CEC defines a start bit; a header block for source and destination addresses; a data block 1 for an optional opcode; and a data block 2 for operands specific to the optional opcode of data block 1. The first data block can be used to convey the charge current information. The CEC frame description is in Supplement 1 of the HDMI v1.4 specification.

The frame description for the CDC defines a start bit; a CEC header block; a CEC Opcode block (0xF8); two blocks designated as initiator physical address, a CDC opcode block; and 0-11 blocks for CDC parameters.

The CDC opcode block can be used for to convey the charge current information. The CDC frame description is in Supplement 2 of the HDMI v1.4 specification.

Essentially any data blocks which are allocated to optional data functions can be used in the system of the invention.

The Invention can be applied to HDMI Sinks and Mobile HDMI Sources, for example in markets such as:

TV market;
AVR market;
Switch Box market;
Mobile Phone market;
PMP market.

As will be understood from the description above, the invention can be implemented with minor modification to HDMI compliant devices and in a way which maintains compatibility with the HDMI standards.

The messaging functions implemented involve already existing hardware and software of the devices, so that only software modification is required to implement the invention. Thus, the module 34 can be implemented as a software modification to the existing hardware of a known HDMI compliant sink device.

Various modifications will be apparent to those skilled in the art.

We claim:

1. A method comprising:
   determining, at a high-definition multimedia interface (HDMI) source, if an HDMI sink is configured to use a Hot Plug Detect (HPD) pin for charging; and
   if the HDMI source determines that the HDMI sink is configured to use the HPD pin for charging, connecting a battery of the HDMI source to the HPD pin of the HDMI source to receive a charging current via the HPD pin of the HDMI source;
   wherein the HDMI sink is determined to be configured to use the HPD pin for charging when at least one of Extended Display Identification Data (EDID) and Enhanced Extended Display Identification Data (E-EDID) is available for reading, the voltage on the HPD is in the range of 4.75V-5.25V, and up to 500 mA of current is available on the HPD pin.

2. A method according to claim 1, wherein the charging current is transmitted by the HDMI sink and received by the HDMI source.

3. A method according to claim 1, further comprising determining, by the HDMI sink, a desired charging condition needed by the HDMI source for charging.

4. A method according to claim 3, further comprising providing, by the HDMI source, information about the desired charging condition of the HDMI source using at least one of a DDC message, a CEC message, and a CDC message.

5. A method according to claim 4, wherein the information about the desired charging condition is a single byte representing a multiple of a unit of charging current.

6. A method according to claim 4, further comprising detecting, by the HDMI source, a voltage level on the HPD pin to determine that the HDMI sink is applying a charging voltage, and if so, awaiting acknowledgement that the HDMI sink has received information about the desired charging condition before using the HPD pin for charging.

7. An apparatus comprising:
   a high-definition multimedia interface (HDMI) source having:
   a Hot Plug Detect (HPD) pin;
   a voltage level detector coupled to the HPD pin;
   a switch coupled between a battery charge circuit and the HPD pin, the switch being configured to selectively couple the HPD pin to the battery charge circuit; and
   a battery coupled to the battery charge circuit; and
   a Display Data Channel (DDC) master circuit;
   wherein the HDMI source is configured to detect if charging current can be drained from the HPD pin and to detect readability of at least one of Extended Display Identification Data (EDID) and Enhanced Extended Display Identification Data (E-EDID) via the DDC master circuit and, if charging current on the HPD pin can be drained from the HPD pin and the readability of the at least one of EDID and E-EDID is detected, await acknowledgement that a corresponding HDMI sink has received information about a desired charging condition before using the HPD pin to charge the battery.

8. An apparatus as claimed in claim 7 comprising a mobile device.

9. An apparatus according to claim 7, wherein the apparatus is adapted to use the charging current to at least one of charge the battery of the HDMI source and power applications running on the HDMI source.

10. An apparatus according to claim 7, wherein, the voltage level detector is configured to detect a voltage on the HPD pin and to determine if the voltage falls within a range suitable for charging.

11. An apparatus according to claim 10, wherein the range suitable for charging is between 4.75V to 5.25V, inclusive.

12. An apparatus according to claim 10 comprising messaging circuitry for providing information about the desired charging condition using at least one of a DDC message, a CEC message, and a CDC message of an HDMI system.

13. An apparatus comprising:
    an HDMI (high-definition multimedia interface) sink having:
        a Hot Plug Detect (HPD) pin;
        a 5V power supply coupled to the HPD pin; and
        a Data Display Channel (DDC) line;
    wherein the HDMI sink is configured to apply a charging current on the HPD pin when at least one of Extended Display Identification Data (EDID) and Enhanced Extended Display Identification Data (E-EDID) is available for reading via the DDC line and information about a desired charging condition of a corresponding HDMI source has been received using at least one of a DDC message, a CEC message, and a CDC message of an HDMI system, and to provide an acknowledgement of receipt of the information.

14. An apparatus according to claim 13, comprising a charging device.

15. An apparatus according to claim 13, wherein the HDMI sink is adapted to provide charging current of up to 500 mA at a voltage of between 4.75V and 5.25V, inclusive.

16. An apparatus according to claim 13, wherein the 5V power supply is adapted to supply at least 20 mA to the HPD pin for enabling pre-charging of the HDMI source.

17. The apparatus of claim 16 wherein:
    the HDMI sink is configured to determine if a battery of the HDMI source is completely discharged and, if the battery of the HDMI source is determined to be completely discharged, transmit a fixed current on the HPD pin of the HDMI sink from the HDMI sink.

18. The apparatus of claim 17 wherein the fixed current is at least 20 mA and has a voltage of 5V.

* * * * *